United States Patent
Holmes et al.

(10) Patent No.: US 12,491,670 B2
(45) Date of Patent: Dec. 9, 2025

(54) METHOD FOR PRODUCING A MOLDED PART AND MOLDED PART

(71) Applicant: adidas AG, Herzogenaurach (DE)

(72) Inventors: Christopher Edward Holmes, Veitsbronn (DE); Daniel Stephen Price, Herzogenaurach (DE); Giridharan Kirupanantham, Fürth (DE); Rowan John Boyd, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 17/449,556

(22) Filed: Sep. 30, 2021

(65) Prior Publication Data
US 2022/0016813 A1 Jan. 20, 2022

Related U.S. Application Data

(62) Division of application No. 16/137,183, filed on Sep. 20, 2018, now Pat. No. 11,161,284.

(30) Foreign Application Priority Data

Sep. 22, 2017 (DE) .................... 10 2017 216 814.5

(51) Int. Cl.
| | |
|---|---|
| B29C 44/04 | (2006.01) |
| B29C 44/00 | (2006.01) |
| B29C 44/02 | (2006.01) |
| B29C 44/08 | (2006.01) |
| B29C 44/34 | (2006.01) |
| B29C 44/58 | (2006.01) |
| B29D 35/12 | (2010.01) |
| A43B 13/04 | (2006.01) |
| A43B 13/18 | (2006.01) |
| B29K 77/00 | (2006.01) |
| B29L 31/50 | (2006.01) |

(52) U.S. Cl.
CPC ........ B29C 44/0415 (2013.01); B29C 44/005 (2013.01); B29C 44/02 (2013.01); B29C 44/04 (2013.01); B29C 44/08 (2013.01); B29C 44/352 (2013.01); B29C 44/356 (2013.01); B29C 44/585 (2013.01); B29D 35/122 (2013.01); *A43B 13/04* (2013.01); *A43B 13/188* (2013.01); *B29K 2077/00* (2013.01); *B29L 2031/504* (2013.01)

(58) Field of Classification Search
CPC .......... B29D 35/12; B29D 35/14; B29C 45/14
See application file for complete search history.

(56) References Cited

U.S. PATENT DOCUMENTS

| | | |
|---|---|---|
| 6,238,602 B1 | 5/2001 | Liu |
| 6,344,160 B1 | 2/2002 | Holtzberg |
| 6,398,996 B1 | 6/2002 | Fang |
| 8,747,711 B1 | 6/2014 | Hausmann et al. |
| 9,049,901 B2 | 6/2015 | Dean et al. |
| 9,447,575 B2 | 9/2016 | Nakagawa et al. |
| 10,759,096 B2 | 9/2020 | Smith et al. |
| 2008/0201993 A1 | 8/2008 | Fukawa et al. |
| 2008/0312353 A1 | 12/2008 | Eibeck et al. |
| 2009/0275690 A1* | 11/2009 | Weaver .................... C08L 23/02 524/507 |
| 2009/0283480 A1 | 11/2009 | Schadler et al. |
| 2011/0232135 A1 | 9/2011 | Dean et al. |
| 2013/0209784 A1 | 8/2013 | Nakagawa et al. |
| 2013/0291409 A1* | 11/2013 | Reinhardt ............ B29D 35/142 36/43 |
| 2013/0328229 A1 | 12/2013 | Helming et al. |
| 2015/0047231 A1 | 2/2015 | Bunnell et al. |
| 2016/0032068 A1 | 2/2016 | Nakagawa et al. |
| 2017/0114185 A1 | 4/2017 | Okamoto et al. |
| 2018/0339441 A1 | 11/2018 | Chen |

FOREIGN PATENT DOCUMENTS

| | | |
|---|---|---|
| DE | 100 37 030 A1 | 2/2002 |
| DE | 202015008971 U1 | 5/2016 |
| EP | 1 396 324 A2 | 7/2013 |
| JP | 2003170762 A | 6/2003 |
| JP | 2013170249 A | 9/2013 |
| JP | 2013213081 A | 10/2013 |
| WO | 2014/177603 A1 | 11/2014 |
| WO | WO 2017115417 A1 | 7/2017 |

OTHER PUBLICATIONS

Extended European Search Report issued in European Patent Application No. 18195862.0, mailed Feb. 20 9, 2019, 7 pages.

\* cited by examiner

*Primary Examiner* — Gregory Listvoyb
(74) *Attorney, Agent, or Firm* — Sterne, Kessler, Goldstein & Fox P.L.L.C.

(57) ABSTRACT

A method for producing a molded part, in particular a component of a sporting good, includes providing a mixture of a polymer melt and a foaming agent and injecting the mixture into a mold. The method includes solidifying at least a first portion of the molded part without foaming and at least a second portion of the molded part after foaming inside the mold, wherein the mixture includes a polymer having an average molecular mass corresponding to a viscosity number ≥130 ml/g, preferably ≥170 ml/g, more preferably ≥190 ml/g and most preferably ≥225 ml/g, wherein the viscosity number is determined via solution viscometry according to the ISO 307 standard.

14 Claims, 4 Drawing Sheets

METHOD FOR PRODUCING A MOLDED PART AND MOLDED PART

TECHNICAL FIELD

The present invention relates to a method for producing a molded part, in particular a sporting good, and to a molded part produced according to the method, a sole plate, a shoe sole and a shoe.

TECHNICAL BACKGROUND

Molded polymer parts are used in many areas of modern manufacturing and technology. More specifically, various methods are known to produce molded parts comprising foamed polymers to obtain components that at are both lighter and have superior mechanical properties compared to non-foamed molded parts. Some methods for processing polymeric foamed materials for application in the manufacture of sports shoes are known, for example from the US 2016/0039162, the CA 2367077, the U.S. Pat. No. 6,613, 811, the CN203040882U and the WO2006090221.

However, the methods disclosed in the prior art have various disadvantages: For instance, the foamed parts in some cases are produced such that they do not have the desired functional properties or only to a limited extent. For example, in the design of a shoe sole, a gradual transition between a flexible forefoot section and a more rigid midfoot section may be needed. Given the teachings of the prior art, such a gradual change is difficult to implement and requires complex molds to form a plurality of reinforcing ribs in some portions of the molded part. Alternatively, the shoe sole may be assembled from a plurality of subcomponents that are produced from different materials and/or with different manufacturing methods. Both approaches lead to production difficulties and therefore high costs. Also, the resulting parts may not be sufficiently stable and break under peak loads.

The present invention is therefore based on the problem to further improve the production process of foamed materials in order to at least partly overcome one or more of the above-mentioned disadvantages of the prior art.

SUMMARY OF THE INVENTION

The above-mentioned problem is at least partly solved by the molded parts such as shoe soles that are produced according to these methods are described in dependent claims 1-13.

In a first embodiment, the present invention provides a method for producing a molded part, in particular a component of a sporting good, comprising the steps of providing a mixture of a polymer melt and a foaming agent, injecting the mixture into a mold, solidifying at least a first portion of the molded part without foaming and at least a second portion of the molded part after foaming inside the mold, wherein the polymer melt comprises a polymer having an average molecular mass corresponding to a viscosity number ≥130 ml/g, preferably ≥170 ml/g, more preferably ≥190 ml/g and most preferably ≥225 ml/g, wherein the viscosity number is determined via solution viscometry according to the method specified in the ISO 307 standard and provides an indirect measure for the molecular mass of the polymer.

This embodiment ensures that a section of the surface of the molded part can be solidified in a controlled manner without foaming, while one or more portions of the molded part, typically interior portions of the molded part, solidify after a micro-cellular foam structure has been formed. The use of a polymer melt comprising a polymer having a high average molecular mass, as indicated by a large viscosity number in the above specified ranges, allows to avoid the forming of voids within the micro-cellular foam.

In this way, lightweight molded parts with superior mechanical, haptic and/or structural properties can be provided. Practical examples include plates with superior bending strength comprising a sandwich structure, wherein an essentially void free foamed core layer is arranged in between and integrally connected with an essentially non-foamed top and a non-foamed bottom layer. Molded parts comprising such as composition may readily be integrated into various types of sporting goods such as shoes, soccer boots, shin guards, skates, skis and many others.

In particular, the polymer melt may comprise a polyamide such as a high-grade polyamide 12. The high-grade polyamide 12 exhibits a higher molecular mass, as indicated by a higher viscosity number, and correspondingly exhibits a higher melt strength and a higher level of foaming (i.e. comprises foam cells of smaller volume and a more homogeneous distribution of the foam cells inside the molded part) than polymers that exhibit less molecular mass, as indicated by a lower viscosity number and resulting in a lower melt strength.

For instance, the melt strength of a polyamide 12 with a viscosity number of 195-225 ml/g has been determined to be more than 100% higher than the melt strength of a polyamide 12 having a viscosity number of 108-126 ml/g. The melt strength of these polymer melts has been determined, via elongational rheology. The much higher level of foaming that is enabled by a material exhibiting a higher melt strength results in molded polymer parts that comprise a more homogenous microcellular foam structure. As a result, there are fewer undesired voids that may degrade the structural integrity of the molded part and molded parts may be manufactured that exhibit a superior stiffness to weight ratio.

In a further embodiment of the invention, the mixture is maintained in its non-foamed state during injecting the mixture into the mold.

This embodiment allows to completely fill simple or complex molds with the non-foamed mixture prior to foaming. Thus, foaming can be induced in a controlled manner after the mold has been filled with the mixture resulting in a higher degree of control over the mechanical and/or structural properties of the molded part during manufacturing.

In a further embodiment of the invention, the foaming agent comprises a supercritical gas and in particular supercritical N2. While generally also other foaming agents might be used, for example CO2 or a suitable chemical foaming agent or a combination thereof, the described embodiment allows to completely refrain from using such agents that are potentially toxic and may cause significant environmental damage. In particular, the foaming agent N2 is available in great abundance, has a low price, is non-toxic, causes no environmental pollution and is easy to store and to process.

In a further embodiment of the invention, the foaming of the mixture is induced by reducing the pressure inside the mold.

This embodiment enables a precise timing of the onset of the foaming. In combination with mold designs that comprise different sections, in which the pressure can be controlled individually, the degree of foaming inside the different sections may be adjusted at will. This allows to manufacture a plurality of molded parts of various shapes and with various degrees of foaming by a single molding process. For instance, the components of a shoe sole that comprises a plurality of bonded layers of material (e.g. an outsole, a midsole and an inner sole), wherein each layer must exhibit a different degree of foaming, can be produced by a single molding process, thereby reducing manufacturing cycle time and costs.

In a further embodiment of the invention, foaming is induced by increasing the volume of the mold, or the volume of the mold is increased during foaming.

This aspect allows to further decrease the density of the foamed portion of a given molded part as compared to foaming the foamed portion without increasing the volume of the mold. Moreover, it is also possible to combine pressure control in the mold and increasing the mold volume prior and/or during foaming resulting in an even larger degree of freedom when manufacturing molded parts. For some embodiments of the invention an increase of the volume of the mold that may be between 0.1% and 500%, preferably between 1% and 150%, more preferably between 10% and 100% and most preferably between 25% and 75% may result in molded parts that exhibit superior mechanical properties as compared to non-foamed molded parts and as compared to molded parts wherein foaming was executed without increasing the volume of the mold.

In a further embodiment of the invention, the mold comprises at least a first cavity and a second cavity, wherein the mixture at least partly solidifies inside the first cavity while the mixture at least partially undergoes foaming inside the second cavity.

This embodiment allows to produce integrated molded parts that exhibit different mechanical properties in different portions of the molded part. In particular, it is possible to produce an improved sole plate of a soccer boot in a single molding step, wherein the sole plate comprises a thin, non-foamed and therefore flexible forefoot section that continuously merges with a thicker midfoot section that exhibits a sandwich structure comprising a non-foamed top and bottom layer enclosing a core of foamed material. A midfoot section that is constructed in this way exhibits a much higher bending strength than the forefoot section, as it is desired for a soccer boot.

For some embodiments of the invention, the mixture is maintained at a temperature between 150° C. and 300° C., preferably between 180° C. and 280° C. and most preferably between 240° C. and 260° C., prior to injection into the mold.

For some embodiments of the invention, at least the section of the mold is maintained at a temperature between 20° C. and 120° C., preferably between 40° C. and 90° C. and most preferably between 50° C. and 70° C.

The above-mentioned process parameters individually or collectively allow to provide lightweight molded parts that exhibit superior mechanical and/or haptic properties as compared to molded parts that are produced with different methods and/or different process parameters.

A molded part that is produced according to the above described invention may be a sole plate for the sole of a shoe, in particular a soccer boot. The sole plate may comprise a non-foamed forefoot section and an at least partially foamed midfoot section, wherein the midfoot section may have a greater thickness than the forefoot section and may provide a higher bending strength than the non-foamed forefoot section.

For example, a soccer boot comprising such a sole plate exhibits a flexible forefoot section that is important for controlling the soccer ball during dribbling and passing and a rigid midfoot section that at the same time stabilizes the foot of the soccer player when shooting the ball.

A dedicated mold design configured for producing a molded part according to the above described invention wherein the volume of a portion of the interior of the mold can be increased in order to achieve localized foaming of the mixture inside this portion.

For instance, localized foaming may be enabled by a mold that comprises at least a first section and a at least a second section, wherein the volume of the portion can be increased by moving the second section.

Such a mold design may result in even greater flexibility when producing molded parts for sporting goods such as sole plates for soccer boots, that comprise different portions desired to exhibit varying degrees of foaming.

BRIEF DESCRIPTION OF THE FIGURES

Aspects of the present invention are described in more detail in the following by reference to the accompanying figures. These figures show.

DETAILED DESCRIPTION

In the following, exemplary embodiments of the present invention of a method for producing a molded part are described in more detail with reference to specific microcellular foam molding processes, such as, for example, the so-called MUCELL® injection molding process. However, it is to be understood that the present invention is not limited to such a specific process but could also be applied to other production methods of molded parts, for example foam molding processes that employ at least one chemical foaming agent or a combination of one or more physical and one or more chemical foaming agent.

Moreover, while specific feature combinations are described in the following with respect to certain embodiments of the present invention, it is to be understood that the disclosure is not limited to such embodiments. In other words, not all the described features have to be present for realizing the invention and the embodiments may be modified by combining certain features of one embodiment with one or more features of another embodiment.

Figure 1:
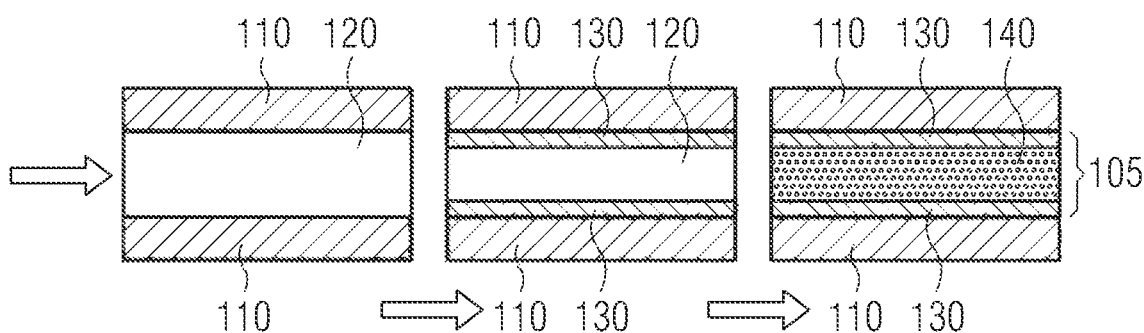
FIG. 1: a schematic illustrating an embodiment of the method according to the invention.

FIG. 1 schematically shows a method 100 for producing a molded part 105 according to an embodiment of the present invention. First, a mixture 120, that may be pressurized, wherein the mixture 120 comprises a polymer melt comprising, for example a thermoplastic polyurethane (TPU) and/or a polyether block amide (PEBA) and/or a polyamide 12 (PA12) and/or any other polymer suited for injection molding and at least a physical (e.g. $N_2$ or $CO_2$) and/or at least a chemical foaming agent, is injected into a mold 110 while the mixture 120 may be maintained in its non-foamed or pre-foamed state. Prior to injection of the mixture 120 into the mold 110 and/or during injection and/or after injection, the temperature of the walls of the mold 110 or at least a section of the walls of the mold 110 may be adjusted such that a portion of the mixture 120 inside the mold 110 solidifies and forms at least a portion of solid, essentially non-foamed material 130.

According to the embodiment shown in FIG. 1, there are two portions of solid material 130 arranged on the outer surfaces of the molded part 105. However, it is to be understood that mold configurations are conceivable that allow to solidify without foaming only a single or more than two portions of the surface of the molded part 105 or even portions of the molded part 105 that are arranged inside the molded part 105.

The thickness of the portion or portions 130 can be controlled during the molding process 100 by adjusting the temperature of the walls of the mold 110 and/or by adjusting the injected volume of the polymer melt that is injected into the mold.

After a certain hold time or immediately during or after injection of the mixture 120 into the mold 110 foaming may be induced in the non-solidified portion 140 of the mixture 120. According to the present embodiment, foaming is induced by expanding the mixture 120 through a nozzle into the mold 110 thereby reducing the pressure of the mixture 120 below a critical value for foaming. The degree of foaming may be controlled by adjusting the injected volume of the mixture 120 that is injected into the mold 110. According to other embodiments of the invention, foaming may also be induced by pressure control and/or a spontaneous or controlled chemical reaction or any other means suitable to induce foaming inside a polymer melt or a mixture 120 of a polymer melt with a physical and/or chemical foaming agent.

In an exemplary embodiment of the above described method, the density of the polymer material inside the foamed core 140 can be reduced by as much as 45% as compared to a non-foamed sample of the same material with the same dimensions. If the polymer comprises, for example, a polyamide 12 with a non-foamed density of 1010 kg/m3 the density of the foamed core 140 of a molded part 105 may be only 566 kg/m3.

After foaming is complete or even still during foaming of at least a portion of the molded part 105, the molded part 105 may be cooled and removed from the mold 110. The resulting molded part 105 may exhibit a sandwich structure, wherein an at least partially foamed inner portion 140 is sandwiched by a bottom and a top portion 130 of non-foamed solid material. The molded part 105 according to this embodiment of the invention may be an outsole or sole plate or a component of an outsole or sole plate of a sports shoe or a soccer boot or any other conceivable sporting goods such as a ski, skateboard and many more.

Figure 2:
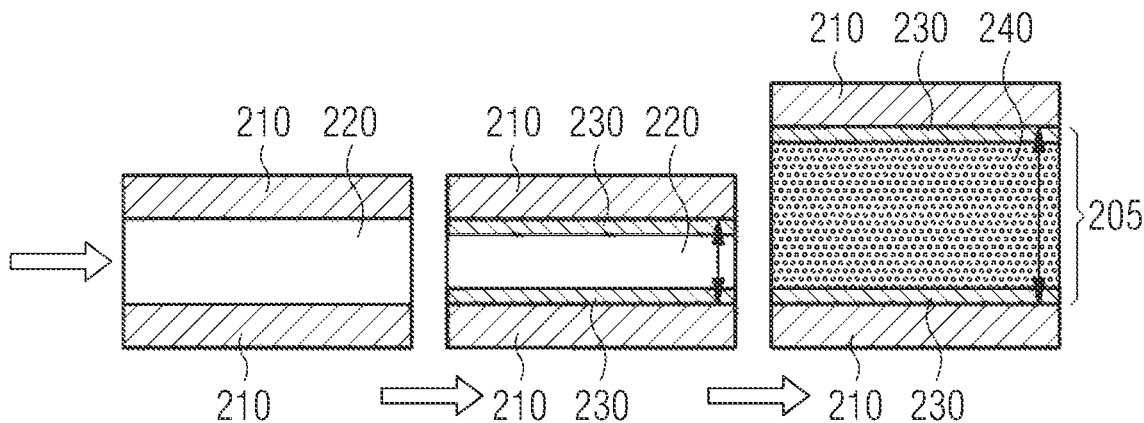
FIG. 2: a schematic illustrating another embodiment of the method according to the invention.

FIG. 2 schematically shows a method 200 for producing a molded part 205 according to another embodiment of the present invention. First, a mixture 220, that may be pressurized, wherein the mixture 220 comprises a polymer melt comprising, for example a thermoplastic polyurethane (TPU) and/or a polyether block amide (PEBA) and/or a polyamide 12 (PA12) and/or any other polymer suited for injection molding and at least a physical (e.g. N2 or CO2) and/or at least a chemical foaming agent, is injected into a mold 210 while the mixture 220 may be maintained in its non-foamed or pre-foamed state. Prior to injection of the mixture 220 into the mold 210 and/or during injection and/or after injection the temperature of the walls of the mold 210 or at least a section of the walls of the mold 210 may be adjusted such that a portion of the mixture 220 inside the mold 210 solidifies and forms portions of solid, non-foamed material 230.

Again, after a certain hold time or immediately during or after injection of the mixture 220 into the mold 210 foaming may be induced in the portion 240 of the mixture 220 that is injected into the mold 210 and has not solidified. However, in this embodiment foaming may be induced by increasing the volume of the mold 210 by, for example, displacing backwards or laterally at a section of the walls of the mold 210. As mentioned before, the foaming may in addition also be induced by reducing the pressure of the injected mixture 220, by expanding the polymer melt through a nozzle into the mold and/or by a spontaneous or controlled chemical reaction or any other means suitable to induce foaming inside a polymer melt or a mixture 220 of a polymer melt with a physical and/or chemical foaming agent.

In the described embodiment of the invention involving an increase of the mold volume, the density of the polymer material inside the foamed core 240 can be reduced by as much as 70% as compared to a non-foamed sample of the same material with the same dimensions. For example, if the polymer comprises polyamide 12 with a non-foamed density of approx. 1010 kg/m3, the density of the foamed core 240 of a molded part may be approx. 355 kg/m3.

After foaming is complete or still during foaming of the remaining non-foamed portion 240 of the molded part 205, the molded part 205 may be cooled and removed from the mold 210. Again, the molded part 205 may exhibit a sandwich structure, wherein an at least partially foamed inner portion 240 is sandwiched between a bottom and top portion 230 of non-foamed solid material. If the molded part 205 has an essentially round shape, there may also be a single, continuous solid surface portion surrounding a foamed inner portion.

Figure 3:
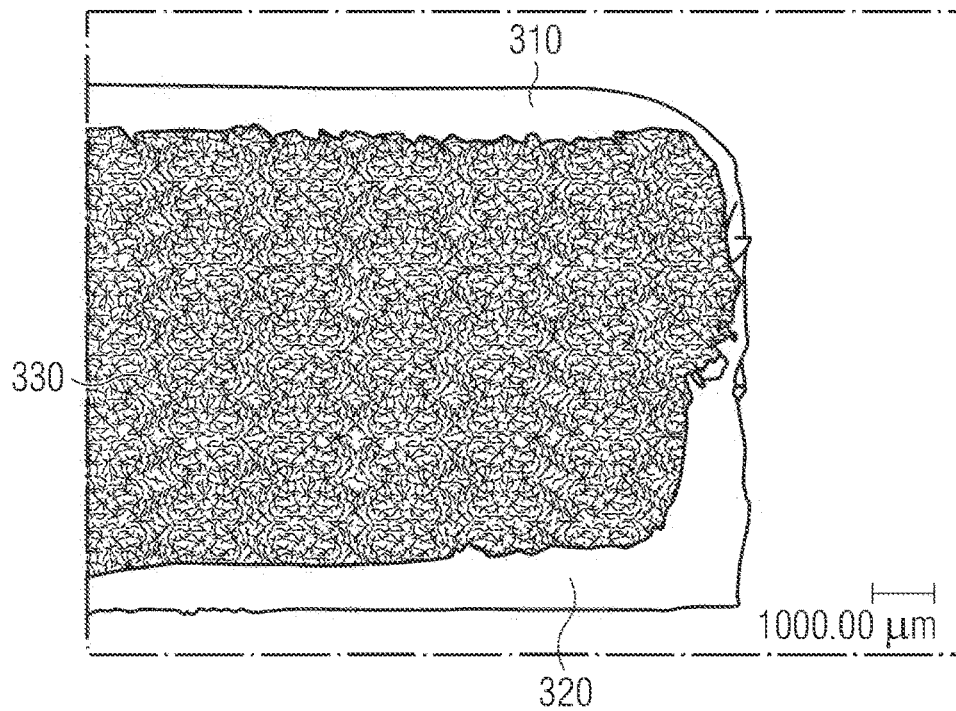
FIG. 3: a micrograph of a cross-section of an exemplary polymer part produced by a method according an embodiment of the invention.

FIG. 3 depicts a micrograph of a cross section through a molded part 300 produced according to an embodiment of the present invention. In this example, the molded part 300 comprises a high-grade polyamide 12 exhibiting a viscosity number ≥190 ml/g. In this embodiment, the polyamide 12 has been mixed with supercritical N2 as foaming agent. After the mixture has been injected into a cuboid-shaped mold or any mold of a different geometry, a solid non-foamed top layer 310 and bottom layer 320 were formed, while foaming is taking place inside the core layer 330 of the molded part 300 simultaneously to increasing the mold volume. In this specific case, the mold volume was increased by approx. 150%.

The resulting molded part 300 shown in FIG. 3 has a thickness of approx. 1000 μm and comprises a foamed inner core 330 with a thickness of a approx. 800 μm. The inner core 330 is enclosed by a surface layer of non-foamed material comprising a top 310 and bottom layer 320, each having a thickness of approx. 100 μm. The inner core 330 exhibits a homogeneous microcellular foam and is integrally and continuously connected with the top 310 and bottom layer 320. Thus, a sandwich structure is formed, as for example desired for midfoot sections of sporting shoes and other application in many other sporting goods. In this example, the density of the foamed inner core 330 is by approx. 70% lower than the density of a molded part of the same volume comprising non-foamed polyamide 12. According to the invention, the thickness of the top 310 and bottom layer 320 can be adjusted by adjusting the temperature of the sections of the mold that are in contact with the top and bottom portion of the mixture inside the mold and/or by adjusting the hold time inside the mold prior to inducing foaming.

Figure 4:
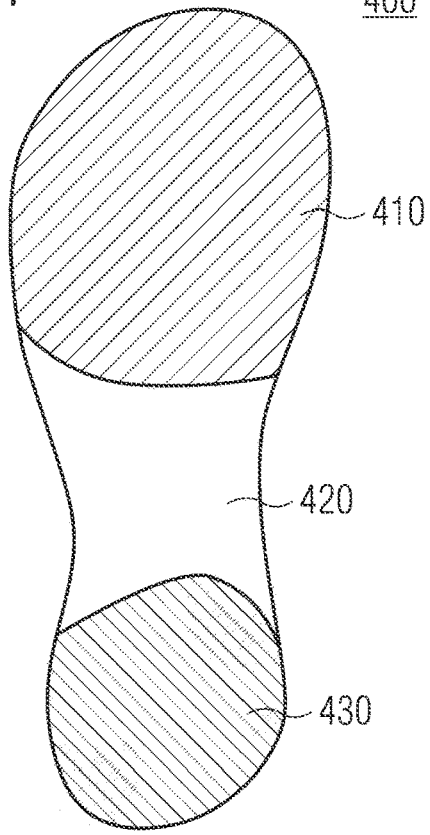
FIG. 4: a schematic top view of an exemplary sole plate.

FIG. 4 depicts a schematic top view of an exemplary sole plate 400 for a sports shoe such as a soccer boot according to an embodiment of the present invention. The sole plate 400 may comprise a plurality of sections as, for example, a forefoot section 410, a midfoot section 420 and a heal section 430. For some embodiments of the invention, as for example the sole plate of a soccer boot, it may be desirable that the forefoot section 410 is designed to be thin and flexible, whereas the midfoot section 420 is designed to be thicker than the forefoot section 410 and to exhibit a larger bending strength than the forefoot section 410. This may be achieved with the production method according to the present invention by just using a single mold and a single injection molding process.

To this end, the mold may be configured such that it comprises at least a forefoot section 410 and a midfoot section 420 which are in fluid communication with each other. During injection molding the polymer melt solidifies inside the forefoot section 410 while substantial foaming only takes place inside the midfoot section 420. In order to attain a high bending strength for the midfoot section 420 of the sole plate 400, the temperature of the midfoot section of the mold may be adjusted such that a solid, non-foamed surface layer forms adjacent to the foamed core region of the midfoot section 420.

Figure 5:
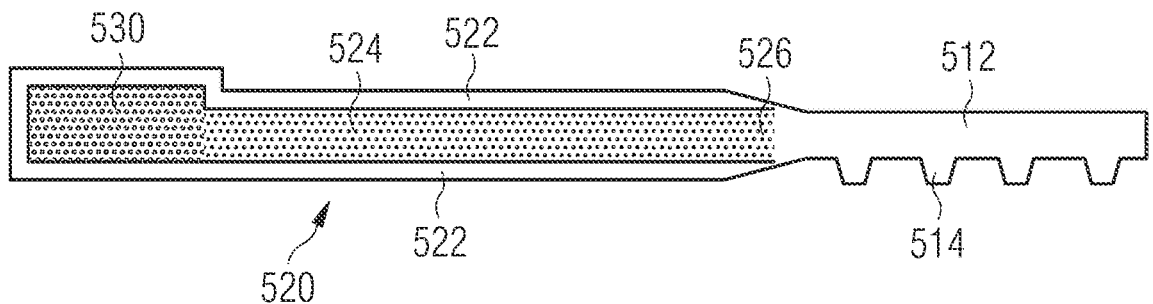
FIG. 5: a schematic cross-sectional view of an exemplary sole plate.

FIG. 5 depicts a schematic cross-sectional view of a sole plate 500 for a soccer boot produced according to an embodiment of the present invention. The sole plate 500 may be constructed from a single material such as TPU or preferably a polyamide 12 with large molecular mass and/or melt strength. Of course, any other material that is suited for injection molding processes may be used as well. Alternatively, the sole plate 500 may be constructed from a plurality of different materials. The sole plate 500 may comprise a forefoot section 512, that may be designed to be thin and flexible. The forefoot section 512 may comprise integrated cleats 514 or other elements (not shown). The sole plate 500 may also comprise a midfoot section 520 that may comprise a non-foamed top 522 and non-foamed bottom layer 523 which may enclose an inner core 524 comprising a foamed material of lower density.

In the embodiment of FIG. 5, the midfoot section 540 continuously transitions via a transition zone 526 into the non-foamed forefoot section 512. A heal section 530 of the sole plate may be attached at the backside of the midfoot section 520. The heal section 530 may comprise a non-foamed material and/or foamed material of either the same type as the midfoot section 520 or a different one. The heal section 530 may be produced via the same production process as the midfoot section 520 and the forefoot section 512 or may be produced differently and may be attached to the midfoot section 520 via a suitable bonding method.

It is apparent, that the production method of the present invention allows to produce an integrated sole plate 500 with a single molding process comprising at least a forefoot section 512 and a midfoot section 520 that comprise a material of different density and different degree of foaming resulting in different mechanical properties for each of the sections, as it is desired for the sole plate of a soccer boot.

Figure 6A:
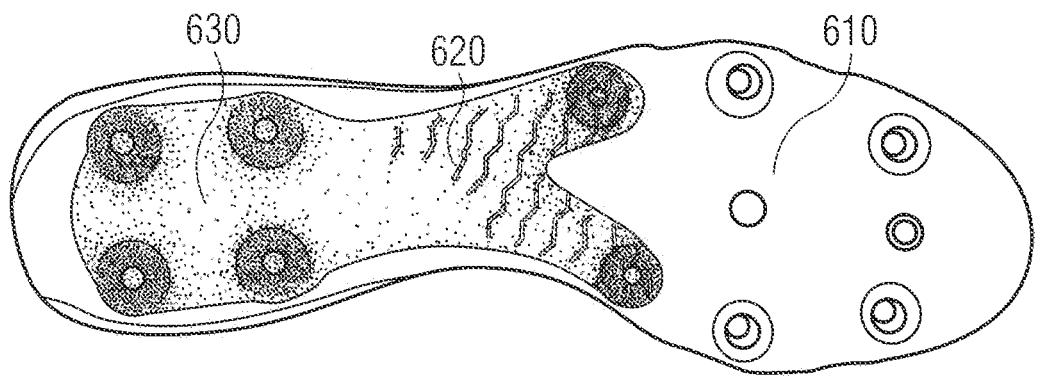
FIG. 6: photographs of a sole plate for a soccer boot in top (FIG. 6a) and bottom (FIG. 6b) view.
Figure 6B:
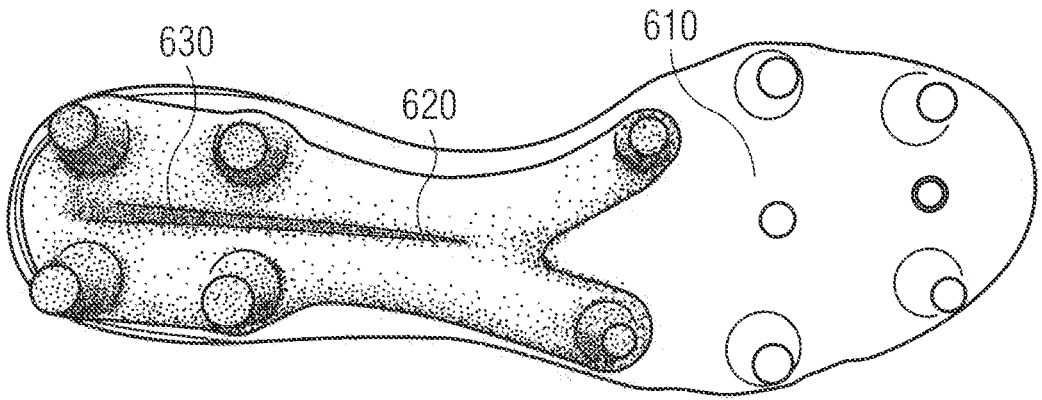

FIG. 6 shows two photographs of a sole plate for a soccer boot in top view (FIG. 6a) and bottom view (FIG. 6b), wherein the sole plate has been produced according to method of the present invention and exhibits a composition as schematically illustrated in FIG. 5 above.

In these photographs, it can clearly be observed that the midfoot section 620 and the heal section 630 comprise an essentially fully foamed polymer material, whereas the forefoot section 610 solidified without undergoing significant foaming. As explained above, this lightweight construction of a sole plate for a soccer boot was manufactured in a single injection molding process and resulted in a sole plate that exhibits exactly the desired mechanical and structural properties. The thin and essentially non-foamed forefoot section 610 exhibits a significantly higher flexibility than the stiff midfoot section 620 and heal section 630, exhibiting a high bending strength and superior stiffness to weight ratio as provided by the low-density microcellular foam structure.

Figure 7:
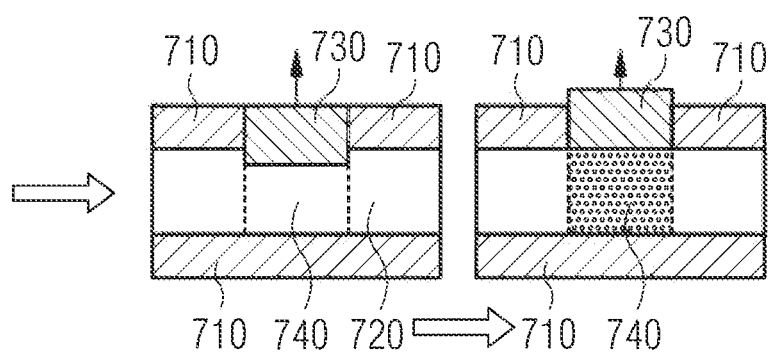
FIG. 7: a schematic cross-sectional view of an exemplary mold comprising a movable section.

FIG. 7 depicts a schematic cross-section of a novel mold design 700 that is configured to perform the production method for a molded part of a sporting good, such as a sole plate, according to the method provided by the present invention.

The mold 700 may comprise at least a first section 710 whose position may be fixed during production of the molded part and a second section 730 whose position relative to the first section 710 of the mold may be adjusted during production of the molded part.

This configuration allows to inject the polymer mixture 720 into the mold while the movable section 730 of the mold is in a first position. During injection or after the mold has been filled with the polymer mixture 720 the second section 730 of the mold may be moved to a second position and thereby the volume of a portion 740 of the interior of the mold 700 may be increased prior and/or during foaming.

As a result, the degree of foaming inside the portion of the molded part adjacent to the movable part 730 of the mold may be increased, potentially resulting in a higher bending strength and/or lower density of the portion of the molded part 740 adjacent to the movable part 730 of the mold.

In this way, the degree of foaming in the portion 740 of the molded part can be precisely controlled and therefore adjusted in response to changing requirements for various types of sporting goods such as sole plates for soccer boots, shoe soles for running boots and many other.

What is claimed is:

1. A molded part produced according to the method comprising:
   providing a mixture of a polymer melt and a foaming agent;
   injecting the mixture into a mold; and
   solidifying at least a first portion of the molded part without foaming and at least a second portion of the molded part after foaming inside the mold in one molding process;
   forming a transition zone between the first portion and the second portion by controlling the foaming between the first portion and the second portion where the material of the transition zone continuously transitions from a foamed state to an unfoamed state;
   wherein the first portion, the transition zone, and the second portion form a single integrated molded part such that there is a continuous transition between the first portion and the second portion,
   wherein the mixture comprises a polymer having an average molecular mass corresponding to a viscosity number ≥130 ml/g, wherein the viscosity number is determined via solution viscometry according to the ISO 307 standard.

2. A sole plate for a shoe, in particular a soccer boot, wherein the sole plate comprises the molded part of claim 1.

3. The sole plate according to claim 2, further comprising an essentially non-foamed forefoot section and at least partially foamed midfoot section.

4. The sole plate according to claim 3, wherein the midfoot section has a greater thickness than the forefoot section.

5. The sole plate according to claim 2, wherein the midfoot section is adapted to provide a higher bending strength than the forefoot section.

6. A shoe sole, comprising:
   the sole plate according to claim 2.

7. A shoe comprising the shoe sole according to claim 6.

8. A molded part produced according to the method comprising:
   providing a mixture of a polymer melt and a foaming agent;
   injecting the mixture into a mold; and
   solidifying at least a first portion of the molded part without foaming and at least a second portion of the molded part after foaming inside the mold,
   solidifying a top surface and a bottom surface of the second portion without foaming such that the unfoamed top surface and the unfoamed bottom surface are positioned above and below, respectively, at least a portion of the foamed second portion;
   wherein the first portion and the second portion are formed in one molding process as a single integrated molded part such that there is a continuous transition between the first portion and the second portion,
   wherein the mixture comprises a polymer having an average molecular mass corresponding to a viscosity number $\geq 130$ ml/g, wherein the viscosity number is determined via solution viscometry according to the ISO 307 standard.

9. A sole plate for a shoe, in particular a soccer boot, wherein the sole plate comprises the molded part of claim 8.

10. The sole plate according to claim 9, further comprising an essentially non-foamed forefoot section and at least partially foamed midfoot section.

11. The sole plate according to claim 10, wherein the midfoot section has a greater thickness than the forefoot section.

12. A sole for a shoe, comprising:
   a first portion formed from an unfoamed material;
   a second portion formed from a foamed material, wherein a top surface and a bottom surface of the second portion are formed from unfoamed material such that the unfoamed top surface and the unfoamed bottom surface are positioned above and below, respectively, at least a portion of the foamed second portion; and
   a transition zone linking the first portion and the second portion, the transition zone formed from material that continuously transitions from a foamed state adjacent to the second portion to an unfoamed state adjacent to the first portion;
   wherein the first portion, the transition zone, and the second portion are formed as a single, integrated part.

13. The shoe sole of claim 12, wherein the first portion is a forefoot section of the shoe sole and the second portion is a midfoot section of the shoe sole.

14. The shoe sole of claim 13, wherein the midfoot section has a greater thickness than the forefoot section.

* * * * *